US012025185B2

(12) United States Patent
Cognolato et al.

(10) Patent No.: US 12,025,185 B2
(45) Date of Patent: Jul. 2, 2024

(54) SEALING ASSEMBLY FOR BEARINGS, IN PARTICULAR FOR USE IN AGRICULTURE

(71) Applicant: AKTIEBOLAGET SKF, Gothenburg (SE)

(72) Inventors: Gianni Alvise Cognolato, Moncalieri (IT); Giorgia D'Amico, Turin (IT); Claudio Foti, Villanova d'asti (IT)

(73) Assignee: AKTIEBOLAGET SKF (SE)

( * ) Notice: Subject to any disclaimer, the term of this patent is extended or adjusted under 35 U.S.C. 154(b) by 147 days.

(21) Appl. No.: 17/747,793

(22) Filed: May 18, 2022

(65) Prior Publication Data
US 2022/0381294 A1 Dec. 1, 2022

(30) Foreign Application Priority Data

May 31, 2021 (IT) .......................... 102021000014135

(51) Int. Cl.
*F16C 33/78* (2006.01)
(52) U.S. Cl.
CPC ...... *F16C 33/7889* (2013.01); *F16C 33/7823* (2013.01)
(58) Field of Classification Search
CPC .......................... F16C 19/185; F16C 33/7823; F16C 33/7883; F16C 33/7886; F16C 33/7889; F16C 2310/00; F16J 15/3208; F16J 15/3212; F16J 15/3232; F16J 15/3256
See application file for complete search history.

(56) References Cited

U.S. PATENT DOCUMENTS

| 2010/0025057 A1* | 2/2010 | Andersson | F16C 19/184 384/544 |
| 2012/0045155 A1* | 2/2012 | Morero | A01B 71/04 384/480 |
| 2015/0267753 A1* | 9/2015 | Ciulla | B60B 7/066 384/489 |
| 2016/0031261 A1* | 2/2016 | Ciulla | B60B 27/0073 384/484 |

FOREIGN PATENT DOCUMENTS

| CN | 104214342 | 12/2014 |
| DE | 112015002746 T5 | 5/2017 |
| EP | 3078887 | 10/2016 |

OTHER PUBLICATIONS

Search Report for corresponding Italy Patent Application No. 102021000014135 dated Jan. 25, 2022.

* cited by examiner

*Primary Examiner* — Phillip A Johnson
(74) *Attorney, Agent, or Firm* — Reed Smith LLP

(57) ABSTRACT

A sealing assembly for bearings, in particular for use in agriculture, the sealing assembly having a first shield, which extends from an outer surface of the inner ring to an inner surface of the outer ring, and is mounted on the outer surface of the inner ring, and a seal with a plurality of contact lips supported by the first shield, and provided with a predetermined number (N) of contact lips arranged in series axially next to one another. The contact lips may lie, when in a respective pre-assembly configuration, in respective planes (P) inclined with respect to a central axis (A) of the bearing, and may have radial lengths decreasing axially towards the bearing.

18 Claims, 1 Drawing Sheet

SEALING ASSEMBLY FOR BEARINGS, IN PARTICULAR FOR USE IN AGRICULTURE

CROSS-REFERENCE TO RELATED APPLICATIONS

This application is based on and claims priority to Italian Patent Application No. 102021000014135 filed on May 31, 2021, under 35 U.S.C. § 119, the disclosure of which is incorporated by reference herein.

BACKGROUND

The present disclosure relates to a sealing assembly for bearings, in particular for use in agriculture.

BRIEF DESCRIPTION OF THE DRAWINGS

The disclosure will now be described with reference to the attached drawings, which illustrate non-limiting exemplary embodiments of the disclosure, in which.

DETAILED DESCRIPTION

Figure 1:
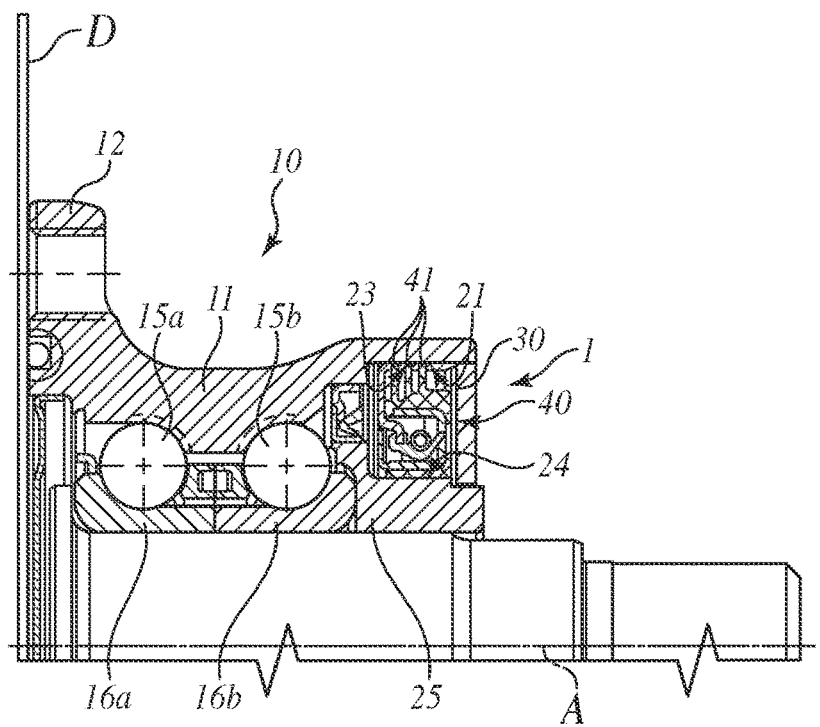
FIG. 1 is an axial cross-sectional view, of both a sealing assembly for bearings, in particular for use in agriculture, and of a bearing unit for the same use, according to exemplary embodiments of the disclosure.

Referring to FIG. 1, a bearing unit 10 has a central axis A. The bearing unit 10 may include a flanged outer ring 11; a radial flange 12 for mounting a ploughing disc D; two rows of rolling bodies 15a, 15b; and for each row of rolling bodies 15a, 15b, a respective inner ring 16a, 16b axially adjacent to the other inner ring 16b, 16a and both mounted on a central support shaft A. The flanged outer ring 11 may be stationary and the inner ring 16a, 16b may be rotatable with central support shaft A, for example.

On the side of the bearing unit 10 facing opposite the disc D, the bearing unit 10 may include a cylindrical seat 21, which is formed in the flanged outer ring 11, and is radially delimited, towards the outside, by an internal cylindrical surface 23 of the outer ring 11 and, towards the inside, by an outer cylindrical surface 24 of an intermediate support ring 25 arranged axially adjacent to the inner ring 16b.

The sealing assembly 1 is inserted in the cylindrical seat 21 in order to prevent the ingress of contaminants resulting from the agricultural labor of working the land, into the bearing unit 10 itself, and includes a front rigid shield 30 arranged between the inner cylindrical surface 23 and the outer cylindrical surface 24 and supported by the inner cylindrical surface 23, and a seal 40 with contact lips, which is arranged next to and contiguous with the rigid shield 30 in a position in which it is protected from the outside by the rigid shield 30, and is provided with three radial lips 41, which, in a non-deformed configuration prior to assembly, lie in respective planes transverse to the axis A, and have radial lengths increasing from the rigid shield 30.

As explained above, so as to prevent the ingress of contaminants into the bearing unit 10, the sealing assembly 1 provides for both the use of a rigid shield 30 and the use of a seal 40 with lips mounted axially in series inside the seat 21; however, this has disadvantages both in terms of production costs and of simplicity and mounting and maintenance both of the sealing assembly 1 and of the bearing unit 10.

Figure 2:
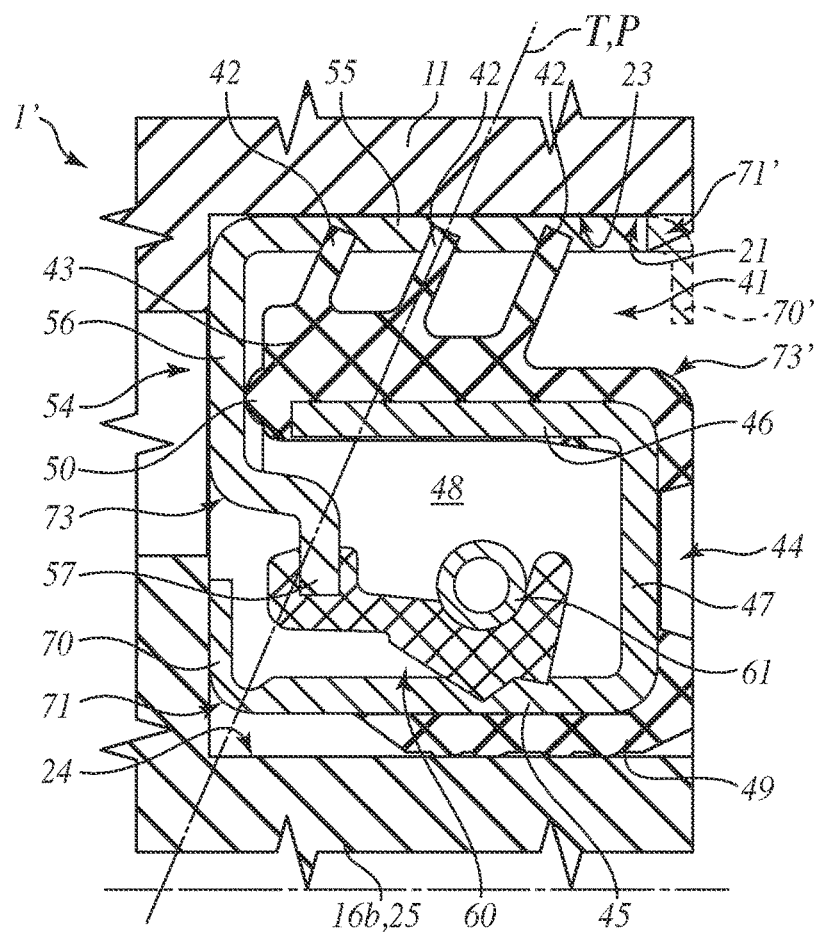
FIG. 2 is a view in axial section, and on an enlarged scale with respect to FIG. 1, of an exemplary embodiment of a sealing assembly for bearings, in particular for use in agriculture, according to the present disclosure.

Referring to FIG. 1, and in particular to FIG. 2, and using where possible the same reference numerals as used above, the reference sign 1' generally designates an exemplary embodiment of a sealing assembly for a bearing unit 10, in particular for a bearing unit for use in agriculture, for example.

According to exemplary embodiments of the present disclosure, the sealing assembly 1' is arranged in the cylindrical seat 21, closing off said cylindrical seat 21, in other words closing off a gap 22 formed by the outer ring 11 and the intermediate support ring 25, and has the function of preventing the ingress of contaminants resulting from the agricultural labor of working the land, into the bearing unit 10 through the gap 22. According to exemplary embodiments of the present disclosure, the sealing assembly 1' is mounted at the intermediate support ring 25, which, as described, is arranged axially adjacent to the inner ring 16b and substantially forms part of the inner ring 16b. Alternatively, the sealing assembly 1' may also be mounted at the inner ring 16b. The explanation below will refer explicitly to the mounting of the sealing assembly 1' at the intermediate support ring 25 but, as just pointed out, it may encompass, without any limitation whatsoever, the mounting of the sealing assembly 1' at the inner ring 16b.

As shown in FIG. 2, the sealing assembly 1' may include a first shield 44, which extends from an outer surface 24 of the intermediate support ring 25, i.e. of the inner ring 16b, to an inner surface 23 of the outer ring 11, and is mounted on the outer surface 24 of the intermediate support ring 25, i.e. of the inner ring 16b. The sealing assembly 1' may further include and a seal 41 with a plurality of contact lips 42 supported by the first shield 44, and includes a predetermined number N of contact lips 42 arranged in series axially next to one another, in which the contact lips 42 lie, when in a rest configuration shown in FIG. 2, i.e. in a pre-assembly configuration, in respective conical planes P (only one of which is shown) with inclined directrices T (only one of which is shown) that are inclined with respect to a central axis A of the bearing unit 10, and have radial lengths decreasing axially towards the bearing unit 10. The planes P in which the contact lips 42 lie are conical planes with respective bases transverse to the axis A, with respective vertices arranged on the axis A, and with directrices T, which all have substantially the same inclination with respect to the central axis A. The directrices T are inclined such that the concave part of the planes P are oriented towards the outside of the bearing unit 10.

In the exemplary embodiment illustrated in FIG. 2, the number N of contact lips 42 is three, although, depending on the use to which the bearing unit 10 is put, a number N of two contact lips 42 may be sufficient for less demanding uses, or a number N of more than three, and up to five or six contact lips 42 may be required for more demanding uses, possibly when working on land with a greater degree of contaminants.

In any case, the following explanation refers to the case in which there is a number N of three contact lips 42, in which, moreover, the contact lips 42 of the seal 41 with a plurality of contact lips have radial dimensions decreasing axially towards the bearing unit 10. The contact lips 42 may be made of polymer material, and start from a base 43 made of the same material: the gradual reduction in radial height of the contact lips 42 may be obtained by means of a gradual axial increase in a radial thickness S of the relative base 43, which goes from a value substantially close to the value of a thickness SL of the contact lips 42 at the contact lip 42 of greatest radial length, to a value substantially triple that of the thickness SL of the contact lips 42 at the contact lip 42 of smallest radial length.

The possibility of having contact lips 42 of different radial heights, all inclined in the same direction prior to assembly, makes it possible, first of all, to better control the final position, in use, of said contact lips 42, i.e. the final position in a deformed configuration of the contact lips 42, which will not touch one another, and will thus easily go from heir pre-assembly configuration to their deformed configuration. Moreover, the contact lip 42 of greatest radial height will also be more flexible than the contact lip 42 of smallest radial height, allowing the seal 41 to adapt easily to possible misalignments of the components of the bearing unit 10 or of the sealing assembly 1' resulting from particularly harsh and difficult conditions of use of the bearing unit 10, while the lesser flexibility, or increased rigidity, of the contact lip 42 of smallest radial height will give the latter greater frictional contact force, ensuring further and better sealing against the ingress of any contaminants into the bearing unit 10.

Moreover, having contact lips 42 all with the same inclination in their pre-assembly configuration makes inversion of the contact lips 42 especially difficult, if not entirely unlikely, both during assembly of the sealing assembly 1', and when the bearing unit 10, and, therefore, the sealing assembly 1' are used in conditions in which the thrust of contaminants is particularly strong, for example when ploughing agricultural land and/or during pressure washing of the agricultural equipment. Having contact lips 42 all with the same inclination, in their pre-assembly configuration, also considerably simplifies production, with the consequent advantages in terms of cost and quality, since the contact lips 42 can not only be removed from the production mold very easily, but without compromising the integrity of said contact lips 42 even slightly.

According to various embodiments of the present disclosure, the first shield 44 in turn may include a cylindrical mounting body 45 fitted on the outer surface 24 of the intermediate support ring 25, i.e. of the inner ring 16b, and a cylindrical support body 46 connected to the cylindrical mounting body 45 by means of a flanged body 47 transverse to the axis A. The contact lips 42 of the seal 41 may be supported by the cylindrical support body 46, and, in particular, the base 43 is anchored and rigidly secured to said cylindrical support body 46. The cylindrical support body lips and the cylindrical mounting body 45 may be mutually coaxial and define, together with the flanged body 47 that joins them, a containment chamber 48 for containing lubricant, which is axially delimited on the side opposite the flanged body 47 by a second shield 54, which forms part of the sealing assembly 1' and extends from the inner surface 23 of the outer ring 11 to the outer surface 24 of the intermediate support ring 25, i.e. of the inner ring 16b. The second shield 54 in turn may include a cylindrical mounting body 55 fitted directly on the inner surface 23 of the outer ring 11, and a respective flanged body 56, which is transverse and rigidly secured to the cylindrical mounting body 55, and has an annular free end 57 arranged substantially close to the chamber 48. The contact lips 42 may be in frictional contact against the cylindrical mounting body 55 and, during assembly of the sealing assembly 1' may be deformed by the cylindrical mounting body 55 from their pre-assembly configuration to their deformed configuration of use: this deformation causes the contact lips 42 to bend towards said concave area of the respective planes P.

In order to enhance the action of sealing against the ingress of contaminants into the bearing unit 10, and to keep said lubricant inside the containment chamber 48, the sealing assembly 1' further includes a shaped lip 60, which may be made of polymer material, and may be supported at the annular free end 57 of the flanged body 56, and may be arranged entirely inside the containment chamber 48 in frictional contact only with the cylindrical mounting body 45 of the first shield 44. The frictional sealing action of the shaped lip 60 may be enhanced by the use of an elastic radial compression means which may be an elastic radial compression spring 61 which is arranged circumferentially right next to the shaped lip 60 so as to exert on the shaped lip 60 a radial compression force about the axis A and press the shaped lip 60 against the cylindrical mounting body 45 of the first shield 44.

Lastly, again to enhance the performance in terms of sealing, and in terms of stability, of the sealing assembly 1' according to various embodiments of the present disclosure, the seal 41 with a plurality of contact lips may further include a cylindrical covering 49 made of polymer material directly connected to the cylindrical mounting body 45 and interposed between the cylindrical mounting body 45 and the outer surface 24 so as to enhance the grip of the cylindrical mounting body 45 and, therefore, also of the first shield 44, on the outer surface 24 of the intermediate support ring 25, i.e. of the inner ring 16b. The sealing assembly 1' may further include an annular profile 50, of semi-circular section, which may be made of the same material as the contact lips 42, and may extend from the base 43 axially projecting from the cylindrical support body 46 so as to be in frictional contact with the flanged body 56 in order to determine a reciprocal axial position of mounting of the shields 44 and 54, and to create a further seal for the containment chamber 48.

Lastly, according to various embodiments, the sealing assembly 1' may further include a bent annular edge 70, which is created once the assembly 1' has been put together, and, in the exemplary embodiment shown, is formed by the first shield 44 by bending radially outwards a free end 71 of the cylindrical mounting body 45. The annular edge 70 may be axially aligned with the flanged body 56, and may make with said flanged body 56 an annular opening 73 which, in the absence of the annular edge 70 may extend radially as far as the cylindrical mounting body 45. Therefore, the presence of the bent annular edge 70 makes it possible to reduce the size of the annular opening 73 and creates a deflector, thereby creating a further barrier against contaminants, preventing them from getting into the bearing unit 10.

Alternatively, according to an alternative exemplary embodiment shown in dotted line in FIG. 2, the sealing assembly 1' may include a bent annular edge 70', which is again created once the assembly 1' has been put together, but may be formed by the second shield 54 by bending radially inwards a free end 71' of the cylindrical mounting body 55. In this case, the annular edge 70' may be axially aligned with the flanged body 47, and may make with said flanged body 47 an annular opening 73' which, in the absence of the annular edge 70' would extend radially as far as the cylindrical mounting body 55. Therefore, the presence of the bent annular edge 70' makes it possible to reduce the size of the annular opening 73' and creates a deflector, thereby creating a further barrier against contaminants, preventing them from getting into the sealing assembly 1'.

Again alternatively, possibly for even more demanding uses, the sealing assembly 1' may include both an annular edge 70 bent radially outwards and an annular edge 70' bent radially inwards.

In addition to the embodiment of the invention as described above, note that it encompasses many other variants. Moreover, note also that these embodiments are merely examples and do not limit the scope of the invention, or its uses, or its possible configurations. On the contrary, while the above description will allow a person skilled in the art to implement the present invention at least according to one exemplary embodiment thereof, note that many variants of the components described are possible without departing from the scope of the invention, as defined in the attached claims, which are interpreted literally and/or according to their legal equivalents.

We claim:

1. A sealing assembly for a bearing unit comprising an outer ring and an inner ring, the sealing assembly comprising:
   a first shield configured to extend from an outer surface of the inner ring to an inner surface of the outer ring, and wherein the first shield is configured to be mounted on the outer surface of the inner ring, and
   a seal comprising a plurality of contact lips supported by the first shield, and wherein a predetermined number (N) of the plurality of contact lips are arranged in series axially next to one another;
   wherein the plurality of contact lips are configured to lie, when in a respective pre-assembly configuration, in respective planes (P) that are inclined with respect to a central axis (A) of the bearing unit, and have radial lengths decreasing axially towards the bearing unit;
   wherein the plurality of contact lips unitarily extends from a base comprising a radial height increasing axially towards the bearing unit.

2. The sealing assembly of claim 1, wherein the planes (P) in which the plurality of contact lips lie have substantially the same inclination with respect to the central axis (A).

3. The sealing assembly of claim 2, wherein the first shield comprises a cylindrical mounting body configured to be mounted on the outer surface of the inner ring, and a cylindrical support body connected to the first cylindrical mounting body; the plurality of contact lips of the seal being supported by the cylindrical support body.

4. The sealing assembly of claim 3, wherein the first shield defines a containment chamber for containing lubricant; the sealing assembly further comprising:
   a second shield configured to extend from the inner surface of the outer ring to the outer surface of the inner ring;
   a shaped lip supported by the second shield inside the containment chamber; and
   an elastic radial compression spring configured for compressing the shaped lip against the cylindrical mounting body configured to be fitted on the outer surface of the inner ring.

5. The sealing assembly of claim 4, wherein the seal further comprises an annular profile made of the same material as the contact lips, and the seal is arranged axially adjacent to the second shield.

6. The sealing assembly of claim 4, wherein the first shield further comprises an annular edge extending radially outward from the cylindrical mounting body.

7. The sealing assembly of claim 6, wherein the second shield comprises a cylindrical mounting body configured to be mounted on the inner surface of the outer ring.

8. The sealing assembly of claim 7, wherein the second shield further comprises an annular edge extending radially inward from the cylindrical support body of the second shield.

9. A bearing unit comprising:
   an outer ring;
   an inner ring;
   a plurality of rolling bodies interposed between the outer ring and the inner ring; and
   a sealing assembly comprising:
      a first shield extending from an outer surface of the inner ring to an inner surface of the outer ring, and wherein the first shield is mounted on the outer surface of the inner ring, and
      a seal comprising a plurality of contact lips supported by the first shield, and wherein a predetermined number (N) of the plurality of contact lips are arranged in series axially next to one another;
   wherein the plurality of contact lips are configured to lie, when in a respective pre-assembly configuration, in respective planes (P) that are inclined with respect to a central axis (A) of the bearing unit, and have radial lengths decreasing axially towards the bearing unit;
   wherein the plurality of contact lips unitarily extends from a base comprising a radial height increasing axially towards the bearing unit.

10. The bearing unit of claim 9, wherein the planes (P) in which the plurality of contact lips lie have substantially the same inclination with respect to the central axis (A).

11. The bearing unit of claim 10, wherein the first shield comprises a cylindrical mounting body mounted on the outer surface of the inner ring, and a cylindrical support body connected to the first cylindrical mounting body; the plurality of contact lips of the seal being supported by the cylindrical support body.

12. The bearing unit of claim 11, wherein,
   the first shield defines a containment chamber for containing lubricant;
   the sealing assembly further comprising:
      a second shield extending from the inner surface of the outer ring to the outer surface of the inner ring;
      a shaped lip supported by the second shield inside the containment chamber; and
      an elastic radial compression spring configured for compressing the shaped lip against the cylindrical mounting body fitted on the outer surface of the inner ring.

13. The bearing unit of claim 12, wherein the seal further comprises an annular profile which is made of the same material as the contact lips and is arranged axially adjacent to the second shield.

14. The bearing unit of claim 12, wherein the first shield further comprises an annular edge extending radially outward from the cylindrical mounting body.

15. The bearing of claim 14, wherein the second shield comprises a cylindrical mounting body of the second shield configured to be mounted on the inner surface of the outer ring.

16. The sealing bearing unit of claim 15, wherein the second shield further comprises an annular edge extending radially inward from the cylindrical support body of the second shield.

17. The bearing unit of claim 9, wherein the outer ring comprises a radial flange.

18. The bearing unit of claim 17, wherein the outer ring further comprises a cylindrical seat on a side of the outer ring opposite the radial flange; wherein the sealing assembly is disposed within the cylindrical seat.

* * * * *